(12) United States Patent
Ward et al.

(10) Patent No.: US 9,260,322 B2
(45) Date of Patent: Feb. 16, 2016

(54) SLUDGE TREATMENT SYSTEM

(75) Inventors: Owen Patrick Ward, Waterloo (CA); Ajay Singh, Milton (CA); Frederick Alan Mosher, Petersburg (CA)

(73) Assignee: LYSTEK INTERNATIONAL INC., Cambridge, Ontario (CA)

( * ) Notice: Subject to any disclaimer, the term of this patent is extended or adjusted under 35 U.S.C. 154(b) by 2131 days.

(21) Appl. No.: 12/260,445

(22) Filed: Oct. 29, 2008

(65) Prior Publication Data
US 2009/0107920 A1    Apr. 30, 2009

(51) Int. Cl.
| | | |
|---|---|---|
| C02F 11/12 | (2006.01) | |
| C02F 1/00 | (2006.01) | |
| C02F 1/66 | (2006.01) | |
| C02F 11/18 | (2006.01) | |

(52) U.S. Cl.
CPC . *C02F 1/008* (2013.01); *C02F 1/66* (2013.01); *C02F 11/121* (2013.01); *C02F 11/18* (2013.01); *C02F 2209/02* (2013.01); *C02F 2209/09* (2013.01); *C02F 2209/10* (2013.01); *C02F 2303/06* (2013.01)

(58) Field of Classification Search
CPC .......... C02F 1/008; C02F 1/66; C02F 11/121; C02F 2303/06; C02F 2209/02; C02F 2209/09; C02F 2209/10; C02F 11/18
USPC ................ 700/266, 267, 273; 702/22, 23, 25, 702/30–32
See application file for complete search history.

(56) References Cited

U.S. PATENT DOCUMENTS

| | | | |
|---|---|---|---|
| 4,471,916 | A | 9/1984 | Donaldson |
| 4,655,932 | A | 4/1987 | Roslonski |
| 4,781,842 | A | 11/1988 | Nicholson |
| 5,013,458 | A | 5/1991 | Christy, Sr. et al. |
| 5,188,741 | A | 2/1993 | Zang et al. |
| 5,266,088 | A | 11/1993 | Sandusky et al. |
| 5,275,733 | A | 1/1994 | Burnham |
| 5,356,540 | A | 10/1994 | Khan et al. |
| 5,435,923 | A | 7/1995 | Girovich |
| 5,679,262 | A | 10/1997 | Girovich et al. |
| 5,681,481 | A | 10/1997 | Christy et al. |
| 5,851,404 | A | 12/1998 | Christy et al. |
| 5,853,590 | A | 12/1998 | Burnham |
| 6,203,722 | B1 | 3/2001 | Hurst |
| 6,808,636 | B2 * | 10/2004 | Ward et al. ..................... 210/710 |

FOREIGN PATENT DOCUMENTS

| | | |
|---|---|---|
| CA | 2076375 | 10/1991 |
| CA | 2221352 | 11/1996 |

OTHER PUBLICATIONS

Sludge disinfection—an overview of methods and their effectiveness, 1984.

* cited by examiner

*Primary Examiner* — Shogo Sasaki
(74) *Attorney, Agent, or Firm* — Anthony Asquith Corp.

(57) ABSTRACT

When liquefying sludge, e.g as in U.S. Pat. No. 6,808,636, the combination of temperature, pH, and shearing, is synergistic. Described here is a system that provides for collating test sampling and full-scale data inputs, recording achieved results and the engineering parameters that achieved those particular results. The data is presented in e.g a table format, which assists design engineers to zero-in on the combinations of parameters that will likely give the desired results.

16 Claims, 1 Drawing Sheet

SLUDGE TREATMENT SYSTEM

This invention relates to the technologies disclosed in patent publication U.S. Pat. No. 6,808,636 (Ward+Burd, 26 Oct. 2004).

That publication describes the synergistic effect, in the treatment of sewage sludge, of subjecting the de-watered sludge to a combination of violent shearing, raised temperature, and raised pH. The discovered synergy makes it possible to increase the cost-effectiveness of the various components and operational effectiveness of the sludge treatment station, in liquefying and reducing the viscosity of the sludge, and in producing other desired characteristics.

However, because the effects of the various components of the treatment are synergistic, it has been found to be largely unpredictable, theoretically, as to just what the levels of the various components of the treatment of the sludge should be, in order to achieve this or that desired property in the treated sludge.

An aim herein is to indicate the data that should be compiled, to enable a table to be created, showing what levels of the various components of the treatment should be engineered, in order to achieve this or that desired property in the treated sludge. Another aim is to show how such a table can be compiled, how the entries in the table can be verified, and how the table should be revised if conditions change.

In principle, an aim is to compile a look-up table showing what designers of a sludge treatment station have to do, and have to provide, in order to optimise the treatment. It is recognised that the treatment depends on the nature of the incoming sludge, and the resources available, and the desired target levels of viscosity and other properties in the treated sludge, and an aim is to predict the most economical, or the most cost-effective, way to produce sludge having those target levels, given those resources.

It might be considered that the simplest thing would be to over-provide the de-watering, shearing, and heating, equipment and power needed to accomplish whatever treatment is desired. Indeed, stations are designed on that basis, when cost is no object. However, it is recognised that, in many cases, the engineers have to deal with a station as it exists. Thus a station might increase its through-put rate if the station had a large reactor capacity; but increasing reactor capacity is very expensive, and the engineers might instead be forced to reduce the through-put rate, or increase the treatment time, to cater for the lack of (volumetric) capacity. Similarly, the de-watering facility at the station might be less than ideal, but the engineers have no option but to work with the level of de-watering that it achieves. It is recognised that these practical limitations are a reality in many sludge treatment stations, and the technology described herein is aimed at enabling the design engineers, in their quest for cost-effectiveness and efficiency, to pick their way through the imposed limitations.

It is recognised that, if the system were being designed from scratch to cater for a particular known invariable through-put of sludge, the destiny of which is also already known and invariable, and particularly if the set-up and running costs are of no concern, then there would be little point in resorting to the detailed data collection, compilation, and presentation, as described herein.

DETAILED DESCRIPTION OF PREFERRED EMBODIMENTS

An example as to how collection of data can be compiled into a useful table will now be described. The scope of the patent protection sought is defined by the accompanying claims, and not necessarily by specific features of exemplary embodiments.

In the example, reference is made to three types of data parameters. These are:
(a) the various given/input/start conditions;
(b) the various target properties (including viscosity) that might be desired in the treated and discharged sludge; and
(c) the engineered levels of the various treatment parameters that will procure those properties, given those inputs.

The input conditions, i.e the data parameters in the above category (a), in the example, include the following:—

(a) (1) Input data: de-watering, degree of Various technologies are available for de-watering sludge, and existing sludge-treatment stations often have a de-watering facility already available.

For a small town, for example, the de-watering facility might consist of, or include, a simple screw-press. Such a press is capable of de-watering sludge from a solids content of e.g 5% to a sludge having a solids content of e.g 12% or 15%. (Percentages mentioned herein are by weight.) That is to say, the sludge has typically been de-watered from 95% water to 85% water. A sludge that has been de-watered from 95% water to 85% water is sludge from which approx 70% of the water has been removed. This squeezed-out water is recirculated, from the sludge treatment station, to be treated in the usual way as liquid sewage.

For a larger town, the expense of a belt-press de-watering facility might be justified. With a belt-press, the sludge can be de-watered to 20% or 25% solids. (De-watering from 5% to 25% solids means squeezing out more than 80% of the water from the sludge.)

For a large city, in addition to the belt-press, the city might go to the further expense of providing a centrifuge, which is capable of de-watering sludge to e.g 30% solids or more (usually with some chemical addition to facilitate the processing). Sometimes, separation of the solid component from the liquid component of the sludge is done, also, at a traditional sewage treatment station, e.g by settling. Various other treatments can be carried out, such as procuring (micro-biological) digestion reactions, both aerobic and anaerobic.

The correlation is not always a strict one, but it may be regarded that sludge that has been de-watered to 10% to 12% biosolids is liquid enough for a measurement of its viscosity to be meaningful, and such sludge has a viscosity, typically, of perhaps 100,000 centipoise. Sludge that has been de-watered to 20% solids, is basically more of a stiff and sticky solid than a liquid, to the extent that its viscosity is unmeasurably high. Sludge that has been de-watered to 30% solids is dry and solid and cake-like, and again its viscosity, as such, is unmeasurable.

Table.1 sets out what the relationship between the different sludge de-watering apparatuses, and the expected level of de-watering that can be expected therefrom:

| Type of de-watering apparatus | Typical/possible % of biosolids, after de-watering |
|---|---|
| simple screw-press | 15% biosolids (1 ton solids + 5.7 tons water) |
| belt-press | 20% biosolids (1 ton solids + 4 tons water) |
| belt-press + centrifuge | 30% biosolids (1 ton solids + 2.3 tons water) |

Table.2 sets out the usual equivalence of biosolids content to viscosity, in sludge that has been de-watered, but not yet subjected to treatment for liquefaction

| Biosolids content | Viscosity of untreated sludge |
|---|---|
| 10% biosolids | just barely liquid |
| 20% biosolids | stiff and sticky |
| 25% biosolids | dry, cake-like, solid |

At these levels, the sludge is basically unpumpable, assuming the use of conventional centrifugal pumps, for liquid and manure handling.

Table.2A shows some actual viscosity measurements on a batch of anaerobically digested de-watered biosolids, at a temperature of 20° C.

| Biosolids content | Viscosity |
|---|---|
| 0% | 2 |
| 2% | 12 |
| 3% | 292 |
| 4% | 552 |
| 5% | 1,250 |
| 6% | 3,500 |
| 8% | 8,800 |
| 10% | 35,500 |
| 12% | 250,000 |
| 15% | over 2,000,000+ |
| 17% | over 2,000,000+ |

(a) (2) Input data: ambient conditions

When compiling the data for the table, it is recognised that not all sludges are the same with respect to these physical properties. Notionally, one could compile respective tables for all the different sludges. However, it is also recognised that sludges are, by and large, the same—at least to the extent that sludge from town P will be the same as sludge from a neighbouring town Q. Even though town P might have decided to incinerate their sludge where town Q decided to spread theirs on easily-accessible farm fields, they are working with basically the same sludge.

However, sewage sludge arising from a town in a cold climate can be expected to be different from the sludge arising in a hot climate. And, from cities in climate areas that have markedly different seasons, the nature of the sludge can be expected to vary, winter to summer. Thus, ambient conditions can affect the amount of resources that have to be expended to convert the incoming sludge into sludge that has the desired discharge properties. Ambient conditions can also affect how the treated sludge can be stored and/or disposed of.

(a) (3) Input data: size of treatment reactor, and rate of through-put. The sludge treatment station has a reactor vessel (or vessels), having a certain capacity (measured in cubic meters, or tonnes, of sludge). The capacity is related to the through-put of sludge, which is dictated by the size and nature of the catchment area from which the station draws its sludge. Naturally, the capacity or size of the reactor should be such that it can deal with whatever through-put is fed to it, both on an instant basis and averaged over an appropriate period e.g one whole day. Designers of sludge treatment systems typically specify a residence time of the sludge in the reactor vessel of e.g one hour.

Thus, a particular typical sludge treatment station might have to handle a sludge through-put of one-tonne per day. (It is stressed that this through-put rate, of one tonne per day, refers to one tonne of biosolids content. The weight of the solids content of the sludge is the same after de-watering as before; the overall through-put, which also includes the weight of the water content of the sludge, of course varies according to the level of de-watering.) A sludge containing one tonne of solids, which has been de-watered to e.g fifteen percent, preparatory to entering the reactor, comprises an overall weight of seven tonnes, i.e the one tonne of solids in the sludge is accompanied by six tonnes of water (approximately). Seven tonnes of 15% sludge has a volume of around six cubic meters. Naturally, the designer will add whatever margins are deemed appropriate, to cater for overloads, servicing, breakdowns, etc.

(a) (4) Input data: power of shearing apparatus. The shearing apparatus is located in the reactor vessel, and is capable of violently shearing the sludge, to the extent of being capable of tearing open the cellular structure of the biological solids component of the sludge, and thereby enabling water locked up in the cells to be released. The motor driving the shearing apparatus associated with the reactor should be rated in terms of the number of kilowatts of shearing power per tonne of biosolids present in the reactor. Typically, engineers specify a shearing motor rated at twenty kW per tonne of biosolids in the reactor vessel. So, for a reactor containing seven tonnes of 15% sludge (which includes one tonne of biosolids) the engineers might typically have specified a shearing motor sized at twenty kilowatts.

It should be understood that the term "reactor" refers also to a sludge treatment station that includes two or more reactor vessels. If the vessels are arranged in parallel, the rating of the shearing motor per vessel is simply a matter of dividing the overall through-put into the appropriate fractions. Alternatively, it might be arranged that the sludge is physically transported from one vessel to the next, in series, and in that case it might be appropriate for the power rating of the first vessel in line to be different from the second vessel. The sludge entering the first vessel is inevitably stiffer and less tractable than the already-partially-liquefied sludge entering the second vessel in line.

(a) (5) Input data: restrictions re length of shearing time In many sludge treatment stations, a key factor is the rate of sludge through-put that can be handled by the station. The prudent engineer therefore seeks to optimise the station in terms of its through-put handling ability (i.e the tonnes per day of sludge that is admitted into the station, treated, and then discharged from the station). Given that the sludge is treated by a combination of shearing, raised temperature, and (usually) raised pH, the investment is made in providing heaters that will quickly raise the temperature of the sludge in the reactor, and in shearing equipment that will impose a maximum violence of shearing into the sludge in a minimum time.

In other types of treatment station, and other destinies of the final sludge, the emphasis might be different—where it is desired for the final sludge to have a high pH, for example.

(b) Desired results of treatment: reduced viscosity. One of the main aims of sludge treatment is to liquefy the sludge, and to reduce the viscosity of the liquid sludge—without, of course, adding water to the sludge. That is to say, the "treatment" should be regarded as a "sludge-liquefaction-event". The lower the viscosity of the liquid sludge, generally the easier the sludge is to handle and to transport. Achieving a low viscosity by retaining a high water content is rather counter-productive. A low-solids (e.g 5% solids) sludge might be easy to pump, but the overall mass of 5% sludge is huge—at 5%, every tonne of biosolids is accompanied by nineteen tonnes of water, all of which has to be transported and stored if the sludge is not de-watered. The aim is to reduce the high-solids (e.g 15%, 20%, 30% solids) de-watered sludges to a viscosity level at which they, too, can be pumped. (This is not to say that adding water is ruled out: there are a number of reasons why engineers might find it economically appropriate to add water to already-dewatered sludge, e.g as the sludge passes through a number of storage and treatment stations.)

On the other hand, it is not true of sludge viscosity that it should always be "the lower, the better". It takes a good deal of resources to liquefy sludge, as explained herein, and so the sludge should only be liquefied or liquidised (i.e its viscosity should be lowered) to the target level required by whatever the sludge is destined for. That is to say: the destiny of the sludge should determine to what viscosity the sludge should be lowered.

(b) (1) Target viscosity: disposal as dried fertiliser pellets
One way in which sludge is disposed of is by de-watering the sludge, then turning the sludge into a very viscous liquid, then forming that just-liquid sludge into pellets, then drying the pellets. The pellets are usable (and even saleable) as fertiliser.

For this, the sludge should be de-watered preferably to 30% solids or higher, then treated by a combination of shearing, heat, and pH, until liquefied to a viscosity of about 10,000 centipoise. This (homogeneous) liquid sludge is dried using conventional systems such as drum driers, dehumidifiers, pelletisers, or the like, or combinations of such methods. If the pH of the sludge is raised using potassium salts, the residual K enhances the fertiliser properties. Disposing of the sludge as dried fertiliser pellets can be desirable in that, in many jurisdictions, regulations governing such disposal are less stringent than those governing e.g the spraying of liquid sludge, and transport and storage costs are lower.

(b) (2) Target viscosity: disposal by incineration Sludge may also be disposed of by incineration. Incineration is carried out after the sludge has been thoroughly de-watered and dried. A number of technologies exist for incinerating sludge. The dried sludge is ignited, and the carbon content thereby burns. One factor affecting the efficiency of the incineration is the fact that even dried sludge still contains much water. For incineration, the engineers should seek to remove as much water as possible from the sludge—however, if the sludge is liquidised, and is even marginally pumpable, the ease and economy of handling are very much improved. Sludge that is to be incinerated should be de-watered as much as possible—to 35% solids, or more, if possible. And preferably, the sludge should be still hot, from being heated in the reactor vessel, when it is sent into the incinerator.

(b) (3) Target viscosity: disposal by application to fields using an injector with mobile tank Sludge to be applied on agricultural fields may be carried in a mobile tank, e.g pulled by a tractor. Sludge can be applied by injection conveniently at viscosities of up to e.g 10,000 cP. Even higher viscosities can be accommodated if the injector apparatus can operate with an elevated injection pressure.

(b) (4) Target viscosity: disposal by application on fields using a mobile injector with static tank Sludge may also be sprayed from a fixed static tank, using a long drag-hose feeding the mobile injector. The length of the long drag-hose will provide more resistance to flow of a viscous liquid passing through the hose, and hence the engineer will usually specify that the viscosity of the sludge to be applied by this method be lower than that for a mobile tank system—more preferably in the range e.g 2,000 cP to 5,000 cP.

(b) (5) Target viscosity: transport Sewage sludge is transported, typically, from a central treatment station to the final disposal site. The sludge might have to be kept in storage for a time, at various points along the chain of events from initial collection to final disposal. Liquid, low-viscosity, sludge can be pumped, which simplifies these required transfers. Moving a pumpable liquid is very much more convenient, and much cheaper, than moving the corresponding quantity of solid cake-like material (which has to be done by costly moving conveyors). Even transport of the sludge within the treatment station, say from the treatment reactor to a storage tank, is much more convenient when the sludge is liquid.

Notionally, any substance that is liquid, even a viscous liquid, can be pumped, using conventional centrifugal pumps, if a high enough pressure is available and can be applied. However, liquid sludge of course is a slurry, containing solids in suspension. Viscosity measurements remain meaningful—that is to say, sludge can be regarded as liquid, or quasi-liquid—at viscosities up to about 20,000 cP. A sludge can be regarded as being liquid enough to be pumpable at viscosities below about 10,000 cP, or even 15,000 cP with available high pressure. "Pumpable", in this sense, means pumpable at rates appropriate to sludge handling—meaning, at a minimum, pumpable through a ten-cm hose, at a rate of about one tonne per hour.

(b) (6) Other aspects re target viscosity For application to fields, the liquid sludge has to be monitored as to possible contamination by pathogens and toxins. The pH of the on-field sludge also has to be within regulated limits. Violent shearing ensures that the liquefied sludge is extremely homogeneous—that is to say, there are substantially no differences or gradients of concentration throughout the body of liquefied sludge, of materials or properties, and there are no unbroken pockets or clumps in which the properties might be very different, and in which residuating microbe colonies might be viable.

Because of the homogeneity of the liquefied sludge, also, measurement readings of temperature, pH, etc now can truly be regarded as measuring not just the property of the liquid between the solid clumps (as can happen when taking measurements in the pre-treated sludge), but a property of the overall whole body of liquefied sludge. Also, any remaining microbe colonies residuating in the treated sludge tend not to be viable, such that live microbial counts remain low for a very long time (e.g months, or even years). These are desirable qualities in any event, but especially so in the case of sludge that is to be spread on agricultural fields in climates where the sludge has to be stored, in the open, for months, before application—e.g over the winter.

In fact, the low viscosity can be regarded as a measure, not just of ease of transport and physical movement of the liquefied sludge, but as a measure also of the homogeneousness of the sludge, and of the advantageous effects arising therefrom. Thus, the engineer might be motivated to specify a lower target viscosity than is actually needed for transport and handling purposes.

Batch vs continuous In full-continuous treatment, de-watered sludge is added, at a slow rate, to an already existing large body of sludge undergoing treatment in the reactor. Treated sludge is drawn off from the reactor, at the same rate. The charge and discharge rates are slow enough, and continuous enough, that e.g concentration gradients and gradients and levels of other parameters remain substantially constant despite the addition and removal of materials.

In full-batch treatment, the reactor is emptied after each batch of sludge. A charge of new sludge is placed in the reactor, and brought up to temperature and pH as required. Shearing is carried out as required, and then the now-treated sludge is all discharged from the reactor.

In partial batch treatment, new material is added into the reactor at such a rate, and with such discontinuity, that the addition of the new charge does make a significant change in the gradients of the physical parameters, temperature, etc.

Generally, full-continuous treatment is preferred, for efficiency's sake. But the reality of varying loading rates can mean that full-batch and partial-batch treatment cannot be ruled out.

It can be economical to provide two reactors at a sludge treatment station. One reactor operates in full-continuous mode, catering for the base through-put loading of the station, while the other operates in batch mode, and caters for the variations and peaks.

In calculating the amount of shearing power to be applied to the sludge, the calculation is done differently depending on whether treatment is being done on a continuous basis or on a batch basis. If the reactor is operated in full-continuous mode, the appropriate measurement is the operating power (in kW) of the shear motor, divided by the through-put rate (in dry tonnes/hour) at which the sludge passes through the vessel. This gives a measurement of so many kW of shearing power applied, per dry tonne/hour of the through-put of sludge being treated. If the reactor is operated in full-batch mode, the appropriate measurement is the power (in kW) of the shear motor, multiplied by the length of time (hours) of the shearing operation on that batch, divided by the number of tonnes of sludge in the vessel. This gives a measurement of so many kW-hrs of shearing energy per tonne of sludge in the batch. (Of course, kilowatts per tonne/hour is dimensionally the same as kilowatt-hours per tonne.)

As to the size of the reactor: for full-batch treatment, of course, the reactor has to be of a size that will accommodate the batch. For full-continuous treatment, the flowrate of the sludge determines the product of the size of the reactor and the residence time that the sludge spends within the reactor. Compare a flowrate of one tonne/hour passing through a large reactor containing e.g five tonnes, with the same flowrate passing through a small reactor containing e.g only one tonne. In the large reactor, the shearing power is applied to five times more kilograms of sludge than in the small reactor, but each kilogram of sludge takes five times longer to pass through the large reactor. Given that the size of the reactor has a major effect on cost, the engineer will often prefer to use the highest-powered shearing unit (and heater), together with the smallest size of reactor, as may be consistent with the need to ensure that all of the sludge receives its proper share of the kilowatts. In this regard, it is noted that shearing produces generally very highly-homogenised sludge, so neither a large reactor nor a long residence time are needed to ensure good mixing and even treatment.

(c) (1) Engineering parameters: degree of de-watering
Obviously, the degree of de-watering is limited to the maximum level that the de-watering machinery will produce. Usually, the engineer will specify that the sludge be de-watered to the maximum degree. However, sometimes, a reduced degree of de-watering might be specified. This might happen, if, for example, a very low viscosity is required in the final sludge, and if that very low viscosity simply cannot be achieved with sludge of too high a solids content, even with a maximum liquefaction treatment. Thus, if a viscosity as low as 1,000 cP is required, for example, the sludge had better not be de-watered to as much as 30% solids, because 30% sludge simply cannot be treated in such manner as to be left with a viscosity as low as 1,000 cP.

(c) (2) Engineering parameters: the heater The heater in the reactor vessel has to be appropriately rated to be capable of heating the sludge in the vessel to the desired temperature. In a typical case, in full-continuous treatment, the heater in a particular vessel, which has to be able to raise the temperature to e.g 70° C., on a cold day, should be rated at e.g twenty kilowatts per tonne/hour of flowrate of the overall sludge (i.e solids plus liquids—the liquids have to be heated too) passing through the reactor vessel. Thus, in a typical case: incoming sludge has been de-watered to 15% solids, and the sludge is passing through the reactor vessel at the rate of e.g seven tonnes/hour of overall sludge (of which one tonne is solids); in that example, the heater should be rated at 140 kW.

(Again, it will be understood that this same parameter can be expressed alternatively in terms of the product of residence time and capacity. Thus, the 140 kW heater, being geared to a sludge flowrate of seven tonnes/hour, is appropriate where the amount of sludge in the reactor vessel at any one time is seven tonnes and the sludge has a residence time, in the vessel, of one hour; the same 140 kW heater would be appropriate also when the in-vessel amount is fourteen tonnes, and the residence time is half an hour.)

Having noted the magnitude of the through-put rate of sludge to be accommodated by the reactor, in tonnes per day, the designer notes what power of heater is available, and what power might be required to maintain that flow of sludge at the highest temperature that might be desired. This would be specified in terms of kilowatts of heater power per tonne of overall sludge (i.e solids plus water) in the reactor. It is noted that the more de-watered the sludge, the smaller the expenditure on heating required to bring the sludge up to temperature, or to maintain it at temperature, since both the solids content and the water content have to be heated.

Typically, as mentioned, the heater would be rated at twenty kilowatts per tonne/hour of overall sludge flowrate, for continuous processing. In the case of batch treatment, the heater probably would be rated somewhat higher, in order to quickly bring the new batch of sludge in the reactor up from cold.

(c) (3) Engineering parameters: the pH-raising facility
Raising the pH of the sludge in the reactor requires comparatively little capital equipment. Rather, the cost lies in the large quantities of alkali salts that have to be tipped into the reactor, to affect the pH of the sludge. To raise the pH of homogeneously-liquefied 15%-solids sludge, from pH-eight to pH-ten, for example, takes about thirty-five kilograms of (dry) potassium hydroxide, per (dry) tonne of sludge.

(c) (4) Engineering parameters: the shearing apparatus The operation of shearing the sludge is responsible not only for tearing open the biological cell material in the sludge solids, but also for thoroughly mixing and stirring the sludge. It is this combination of effects that leaves the liquefied sludge so highly homogeneous, i.e homogeneous on a scale even smaller than that of the biological cells. It is this violent stirring also that ensures the pH salts reach every cranny of the whole body of sludge (and not just the liquid parts of the sludge between solid macro-clumps of sludge—which can be the case when sludge is not thoroughly stirred.) The inherently-vigorous stirring that goes with shearing also ensures there are no gradients of temperature, throughout the sludge in the reactor, again on a smaller-than-cellular scale.

The engineer should note the power rating of the (electric) motor of the shearing apparatus, and whether it is sufficient to liquefy the discharged sludge down to the lowest viscosity likely to be required, within an appropriate processing time. Typically, the engineer will select a shearing motor power rating of about forty kilowatts per tonne/hour of the dry-solids content of the sludge passing through the reactor on a continuous basis. On a batch treatment basis, equivalently, the engineer would provide for forty kilowatt-hours per tonne of the solids content of the sludge in the batch. However, for the less efficient batch treatment, the engineer would typically specify a shearing motor that will impart power at e.g fifty kilowatt-hours per tonne of sludge in the batch. (These power figures would typically be measured simply as the volts x amps of the electricity supplied to the shearing motor.)

(c) (5) Engineering parameters: processing time The liquefaction of high-solids sludge is done most efficiently when the shearing, heating, and pH-raising aspects of the treatment are carried out all at once. Thus, a charge of sludge resides in the reactor vessel, where is it subjected to all three aspects of the treatment simultaneously. As mentioned, usually the engineer will be aiming to minimise the time the sludge resides in the reactor vessel, so as to maximise through-put of the sludge. Generally, the more powerful the shearing motor, the shorter the time it will take for a given quantity of sludge to be liquefied to a particular target viscosity. However, sometimes there is plenty of time for sludge treatment, in which case a reduced shearing power may be employed. Thus, it is the amount of energy expended on shearing, rather than just the power of the shearing, that determines the degree of liquefaction.

With shearing, there is diminishing-returns effect. That is to say, a particular level of simultaneous shearing, heating, and pH-raising, even if continued indefinitely, still will not lower the viscosity of the sludge below a particular asymptote. Thus, it is usually uneconomical to continue with the treatment, once the sludge has been liquefied to within say 20% of its lowest possible limit of viscosity.

Now, upon coordinating the above items, it is recognised that it possible to construct a table, in which the various items of input data are entered, along with the various disposal regimes for which the sludge might be destined. That having been done, entries can also be made as to what the levels of the engineered processes need to be, in order to bring about those destinies. That is to say: event-records are kept, and listed, of several sludge-liquefaction-events; these can be records of actual sludge-liquefaction-events in already-existing treatment stations, and can include event-records of laboratory tests carried out simply for the purpose of securing the data.

(a) The input data may be summarised as:

(1) The type of de-watering apparatus, and the consequent maximum degree (measured as a percentage of solids) to which the sludge can be de-watered. Knowing the de-watering percentage of the sludge is basically equivalent to knowing also what will be the handling properties of the sludge, i.e whether the sludge will be cake-like, paste-like, viscous-liquid-like, etc, before treatment commences.

(2) The ambient temperature and other ambient conditions, as they affect the nature of the incoming sludge; as they affect the target viscosity (and other parameters) needed in order to achieve a particular destiny of the sludge; and as they affect the type and degree of treatment needed to achieve that viscosity.

(3) The size or capacity of the reactor at the treatment station, which may be measured as a volume in cubic meters, or as a weight in tonnes of (overall) sludge.

(4) The maximum power rating of the motor that drives the shearing apparatus associated with the reactor.

(5) Any restrictions/flexibilities regarding the time available for the shearing operation.

(b) The target viscosity to be aimed for, as dictated by the particular destiny of the treated sludge, whether the sludge is destined for disposal or for further treatment, may be summarised in tabular form, in Table.3:—

| Intended destiny of treated sludge the as-treated sludge is to be:- | Typical Target viscosity (centipoise) |
| --- | --- |
| processed directly to dried form (e.g pellets) | 10,000 |
| incinerated | 8,000 |
| transported by tanker truck | 5,000 |
| on-field pressure-injected using a mobile tanker vehicle | 4,000 |
| on-field pressure-injected using a mobile injector coupled to a static tank via a long drag-hose | 2,000 |
| on-field gravity-injected using a mobile tanker vehicle | 1,500 |
| stored over a winter, including freezing/thawing, and then on-field gravity-injected via long drag-hose in the spring. | 1,000 |

The entries in the Table.3 should be understood as being typical target viscosities that an engineer might specify as being appropriate to those destinies. Another engineer (e.g one who can use higher injection pressures, or who has access to a less powerful pelletisation press) might specify different target viscosities.

(c) The engineering treatment event-parameters can be summarised as follows:—
(1) How much de-watering in the sludge entering the reactor?
(2) What temperature in the reactor?
(3) What pH in the reactor?
(4) How much shearing power/energy? and how long for, in the reactor?

De-watering The engineer's task is to specify whether de-watering is to be done at the maximum level at which the de-watering apparatus can operate—which it usually will be, unless the desired viscosity simply cannot be reached from that level, in which case the de-watering apparatus is operated below its capacity. As mentioned, specifying the de-watering level may be regarded as being equivalent to specifying the pre-treatment viscosity of the sludge, as shown in Tables.1,2. Thus, the engineer might specify an appropriate one of e.g 30% solids=dry, cake-like, sludge for which a viscosity figure is meaningless; 20% solids=stiff, sticky, sludge; 10% solids=wet sludge having a viscosity of 35,500 cP; and so on.

Heating Similarly, the engineer should specify to what temperature to raise the sludge in the reactor vessel. Typical values might be 40° C., 55° C., 70° C., 85° C., etc.

pH. The engineer should specify the pH level to which the sludge is to be elevated. This might be 7.5, 8.5, 9.5, 10.5, etc. The pH of the sludge typically is raised by adding chemicals into the reactor.

Shearing power and processing time The engineer should specify what degree of shearing is required. This is measured in kilowatt-hours of shearing energy per tonne of sludge in the reactor vessel (for batch operation); or (for continuous operation) in kilowatts of shearing power per tonne of sludge through-put per hour. The engineer might specify shearing at e.g five or ten kilowatts of shearing power per tonne/hour of (solids content of the) sludge, if there is plenty of time for treatment, or e.g at twenty or fifty kilowatts per tonne/hour of sludge flowrate, if it is desired to maximise the through-put rate.

In order to determine just what numbers to specify for the various engineering event-parameters, the engineer constructs a table as in the following example, or such part of the table as will cover the range of relevant operational conditions. The data for the table comes from observed and experimental data. It is recognised that it would be practically impossible to construct the different data items by theoretical calculation, because of the synergistic nature of the interaction between the treatment parameters. Once the data has been assembled and presented, the engineer can then read off the optimum values of the parameters.

Table.4, below, indicates how the various resources available for overall treatment preferably should be noted, in respect of several actual sludge treatment stations. Table.4, when built up, displays the different resources available at several different treatment stations.

| Sludge treatment station | available max de-watering | available reactor volume + weight (overall) | available shear power | available heat power | available time for shearing | batch/ continuous/ partial |
|---|---|---|---|---|---|---|
| | % | cu · m + tons | kW | kW | | |

In Table.4:
"available max dewatering" is the available maximum level of de-watering that can be provided by the de-watering apparatus of the station. The level is measured as the percentage of solids in the de-watered sludge.

"available reactor volume" is the maximum volume of sludge (solids plus water) that can be accommodated in the reactor vessel at one time. Measured as a capacity, in cubic meters.

"available reactor weight" is the maximum overall weight of sludge (solids plus water) that can be held in the reactor vessel at one time. This weight depends on the degree to which the sludge has been de-watered. (The available reactor capacity, if low, can be a limitation as to what sludge through-put rate can be achieved.) Measured in overall tonnes of sludge. (Overall=solids plus water.)

"available shear power" is the maximum power that can be applied to the sludge in the vessel, using the available shearing apparatus associated with that vessel. (The available shearing capacity, if low, can be a limitation as to how much the viscosity of the liquefied sludge can be reduced, which might mean that the sludge should not be de-watered so much.) For continuous treatment, measured as kilowatts of power available from the (electric) motor driving the shearer blades, per tonne/hour of dry solids content of the sludge flowrate through the reactor. For batch treatment, measured as kilowatt-hours of energy per (dry) tonne of sludge in the batch.

"available heater power" is the maximum heating power that can be applied to the sludge in the vessel, using the available heating apparatus associated with that vessel. (This available power, if low, can be a limitation as to what temperature can be reached, of the sludge in or passing through the reactor vessel. Also, the available heater power affects how quickly the sludge being processed can be brought to the optimal processing temperature. When seeking to maximise flowrate, this speed would be important.) For continuous treatment, available-heater-power is measured as kW of heating power per overall tonne/hour of sludge passing through the reactor vessel. Of course, the heater has to heat the liquids and the solids to the same temperature. For batch treatment, measured as kW-hours of heat energy to be supplied, per tonne of overall sludge in the batch.

"available time for shearing" refers to any limitations as to time constraints. The designer of the system usually aims to maximise the rate of through-put (i.e to minimise the residence time the sludge spends in the station). However, sometimes the aim is to minimise expenditure of resources other than time.

"batch/continuous/partial" refers to whether the station will operate in continuous mode, as is preferred when seeking to maximise economy, or whether, e.g for reasons of flexible response to varying through-put, the station will operate in batch or partial batch mode.

In Table.4, the data items represent the maximum available levels at which the various apparatuses can act, the values of which have been entered for the particular sludge stations. when designing a new treatment station, the engineers must make sure that the operational performance required to procure a given viscosity is in fact available at the particular station. By the use of Table.4, designers can relate the resources that are available in the station being designed to the resources that were available in existing stations.

Table.5 presents the operational performance parameters that, in the past, have resulted in the particular target viscosity. Thus, the several lines or rows of Table.5 represent respective actual sludge treatment stations, operating at particular levels of performance. Thus, row A might present data as to what the performance parameters actually were, as a matter of recorded fact, which resulted in liquefying sludge at S% solids down to a target viscosity of TV centipoise, at a particular existing station. Row B of Table.5 might contain data derived from testing laboratory samples. In row C of Table.5, the data items might be estimates (i.e guesses), and subject to e.g experimental confirmation.

| Data Set | applied level of dewatering; start viscosity % cP | through-put of dewatered sludge tons/day | target viscosity cP | applied shear power kW | required temperature deg C. | applied heat power kW | required pH pH | amount added salt tons/day |
|---|---|---|---|---|---|---|---|---|
| A | | | | | | | | |
| B | | | | | | | | |
| C | | | | | | | | |
| N | | | | | | | | |

In Table.5:
"applied level of dewatering" is the degree to which the sludge is actually de-watered, which might or might not be the maximum.

"start viscosity" is the viscosity of the sludge after it has been de-watered, and before it enters the reactor. The viscosity of the sludge only approximately corresponds to the level of de-watering; so, the level to which the sludge has been de-watered prior to treatment should preferably be recorded, even if pre-treatment viscosity is recorded as well.

"through-put of dewatered sludge" is the through-put rate of sludge the station has to cope with, measured in tonnes per hour of overall (solid plus liquid) de-watered sludge—which depends on the level to which the sludge has been de-watered.

"target viscosity" is the viscosity that is to be procured in the treated sludge emerging from the reactor, given the destiny of the sludge after treatment.

"applied shear power" is the power at which the motor of the shearing apparatus of the reactor is driven, which might or might not be all the available shear power, in procuring the required viscosity.

"required temperature" is the temperature to which the sludge in the reactor is raised, in seeking to achieve the required viscosity.

"applied heat power" is the heating power needed to achieve the required temperature, which might or might not be all the available heater power.

"required pH" is the pH to which the sludge in the reactor is raised, in seeking to achieve the required viscosity, and where needed to maintain a low microbial count in stored treated sludge.

"amount applied salt" is the quantity or rate at which pH-raising alkali salts etc are fed into the reactor, to achieve the required pH. Measured e.g in tonnes per day.

Again, it should not be understood that every single one of the lines of data on Table.5 must have been derived from an actual existing station (or laboratory), or must have been the subject of a specific physical experiment. It is possible to place a few actually-determined figures in the table, and then to make estimates for the interpolations between them. However, the aim should be to provide enough actually-determined figures that interpolations made later by users of the table, to design their own new stations, can be relied upon. Estimating should be regarded as second best. At least notionally, all the entries should be confirmed by actual experiment.

Again, it is noted that the combination of heating and shearing produces unpredictable synergistic effects, particularly as regards the viscosity thereby achieved, whereby engineers designing a new sludge liquefaction station should be reluctant to rely upon interpolation and extrapolation—at least when more than one of the event-parameters has been changed—because of the unpredictable synergy.

Again, one of the main reasons for compiling and tabulating the data on past liquefaction-event-records is to provide a look-up table. An engineer seeking to design a new station (or to modify an old station, or to determine whether an old station will be capable of a new level of performance) can, from the table, look up the previous liquefaction-events that have produced final-viscosities close to the target-viscosity the engineer has in mind for the new station. From the data on those tabulated events, the engineer can zero-in on a good "fit"—given the constraints on the design of the new station—of the target-procurement-levels, and particularly of the shearing and temperature parameters.

The reluctance to rely on interpolation and extrapolation may be particularised as follows. Preferably, the table should include enough liquefaction event-records that there is at least one record, in the table, in which the final-viscosity of that record is within twenty percent of the target-viscosity.

Preferably, also, the sludge temperature to be used in the new station should be within ten degrees of the sludge temperature recorded in that event-record.

Preferably also, the shearing power or energy to be employed in the new station should be within twenty percent of the shearing power or energy that was recorded in the event-record.

Preferably, also, these preferred maximum differences between the target parameters and the event-parameters listed in the nearest event-record, should be reduced, and preferably halved, in a case where both the target heating and the shearing power, in the new station, appear to be substantially different, simultaneously, from the heating and shearing power employed in procuring the final-viscosity recorded in the event-record.

That is to say, when two of the target-procurement-parameters are simultaneously substantially different from the corresponding parameters in the nearest event-record, the maximum allowable differences between the target-procurement-parameters in the new station and the event-parameters listed in the nearest event-record preferably should be within half the above figures.

Prudent design engineers should, if the event-parameters in the event-records in the table are further away from the target-viscosity and the target-procurement-levels, than indicated by the above maximum differences, add to the table by procuring some further liquefaction event-records, aimed at filling in the gaps in the table. (These can mostly be done by liquidising samples of sludge in a small reactor, on a laboratory basis.)

It is not ruled out that the data compiler might initially guess most of the entries. The guesses can then be gradually confirmed or revised by experiment, and the other numbers can be revised in the light of that experience. Eventually, the whole table can be populated with actual physical test results. It is noted, again, that the effects of simultaneously varying two (or more) of the liquefaction-event-parameters, are largely unpredictable, because of the synergistic nature (i.e not simply additive nature) of the combinations of the treatment components, with the result that the initial guesses are likely not to be accurately predictive.

Also, the data that is actually recorded in the table can be refined, and added to, over time. Thus, the compiler might compile the table initially using just a few data components (columns of the Table), then add some more data components (columns) later, as this or that parameter, which might have been overlooked originally, is now found to have a significant effect, when it comes to designing new stations.

The acquired data preferably is compiled in such manner as would enable Table.5 to be constructed—but it is not necessary that a Table.5 actually be constructed, as a table. On the other hand, of course, a table such as Table.5 is a very convenient way of presenting the data. Again, the entries in Table.5 are unpredictable, because the effects of the components are complexly synergistic. If the effects were simply additive, preparing the table would be trivial. This is not to say that some of the data entries would or might not be inferrable, given the other entries; but notionally, all the data items should be subjected, eventually, to experimental verification.

It is recognised that if the results did not need to be checked physically, i.e if Table.5 could be filled in from theoretical calculations alone, there would be little need for the described innovation. It is recognised, also, that carrying out inexpensive experiments on small samples does in fact give rise to data that is, in the present case, very well predictive of what will actually be encountered in the real commercial sludge treatment station. (By contrast), in many activities associated with sludge treatment, data derived from testing laboratory samples turns out to have little correlation or predictability when compared with real life performance. It might be surmised that the good correlation or predictability, between experiments and actuality, arises from the extreme homogeneousness of sludge that has been treated by shearing—which is likely not present in sludge that has not been sheared.)

Once Table.5 is constructed, the engineers now have a look-up tool, which will enable them to optimise the physical attributes of a new (or modified) sludge treatment station, and to arrange its operational parameters in the most cost-effective way.

It might be considered possible for the designers to decide upon the physical and operational parameters that will be needed, by trial and error. One aim of the present innovation is to avoid having to resort to the wastefulness of trial and error. Now, the engineers can look up the Table.5 data, and can predict whether, and to what extent, a particular apparatus and procedures will be successful. The engineers do not have to over-engineer the sludge treatment system (or at least, not for reasons of ignorance)—which can be a large cost saving. And they can see and avoid cases where a particular treatment station just cannot achieve what directors and investors want.

It should be noted that the numbers in Table.5 might need to be changed, over time, e.g as de-watering or shearing techniques become more efficient, or as energy or pH salts become more or less costly.

In using Table.5, the design engineers typically proceed as follows. Using the table, they check whether the data on the particular input conditions respecting the installation under consideration have been encountered before, either in commercial operation or in experiments, and have been entered into the table. They check also whether the particular target viscosity has been produced before, using similar input conditions. If so, the operational parameters that produced (and assumedly will again produce) that viscosity can be read off Table.5.

If the conditions of a sludge treatment station under consideration are not to be found on Table.5, with at least some reasonable degree of similarity and equivalence, the engineers now will have to resort to further experimentation in order to establish what are the most cost-effective levels of the operational parameters to produce the desired target viscosity, in the new station, or under the new conditions. But that means that a new line has been added to Table.5, i.e those experiments have now been done for the new conditions, so Table.5 itself will have been extended, which will enable some further future variations to be accommodated without having to resort to trial and error.

In determining what treatment parameters to use in a given case, the engineer prepares a table (i.e a two-dimensional spreadsheet) along the lines of Table.5. From the rows or lines of treatment records in the spreadsheet, a line is picked out that gives rise to a final viscosity at or near to the desired target viscosity. Then, a check is made that the picked-out treatment parameters of that treatment record actually do lie within the capabilities and restrictions of the equipment available, restrictions as to cost, etc.

The engineer might also look at other targets besides viscosity, e.g a target pH—even a target temperature, if the particular case requires that. Thus, if the sludge is destined for incineration, it can make sense to heat the sludge to a high temperature while shearing. If there are several lines (i.e records of treatment parameters) on the spreadsheet which all result in viscosities near to the target, which are within the available equipment capabilities, presumably the treatment parameters will be chosen according to the one that works out cheapest for the particular new (or modified) station. Again, it is not suggested that the spreadsheet cannot be refined to include some other components, if that is deemed advantageous.

Table.6, following, represents a preferred minimum of data that should be preferably tabulated, in order to gain the benefits, as described herein, of avoiding costly trial and error.

| Data Set | start viscosity cP | target viscosity cP | required shear power kW-hrs per ton or kW per ton/hour | required temperature deg C. | required pH pH |
|---|---|---|---|---|---|
| A | | | | | |
| B | | | | | |
| C | | | | | |

It should be noted, in respect of Table.6, that the required temperature needed to achieve a given target viscosity might be so low that no expenditure of energy in the form of heating is required. Equally, the needed pH might be so low that no pH-altering substances need be added into the reactor. That is to say, it might even be possible, in some cases, if the desired reduction in viscosity is a modest one, for the target viscosity to be achieved by shearing alone, without raising either the pH or the temperature of the sludge in the reactor.

In compiling the table or spreadsheet, either on the minimal basis of Table.6, or preferably the more detailed basis of Table.5, what is required is to record a number of sets of treatment parameters, which together result in respective particular viscosities in the treated liquefied sludge. These sets of values of the different parameters may appear as the respective lines or rows of the table, while the types of parameters may appear as the respective columns of the table.

Again, it is recognised that the records can be records of real treatments of sludge, in a full-size reactor, or the records can be records of testing small samples in a test reactor, and again it is recognised that small-scale experimental results can be read as full-scale results with good predictability. As mentioned, the records might even be estimates, or guesses, of what viscosity will or might result from a particular set of treatment parameters—although the level of predictability here is so low as to make some actual results (experimental or full-scale) highly preferable.

The number of records or lines (rows) of the Table.5 or Table.6 represents the number of tests carried out (or guessed at). These might encompass the full range of sludge treatment, including all variations of shearing power and time, temperature, and pH, and wide variations in target viscosities. Or the table might concentrate on just one aspect, such as minimising cost at the expense of processing time. In any event, the more records in the table, generally the more accurately and quickly the engineer can zero in on the best set of treatment parameters for a particular new treatment facility, without having to resort to further trial and error testing. There is no upper limit to the advantageousness of providing more records in the table, other than practicality; at the other end of the scale, the table should include more than two records, or lines, in that a table with as few as just two records would hardly be useful in helping the engineer design a new station.

This specification deals with dimensions and units. It should be understood that some of the units mentioned are, or can be, derived from other units. Thus, a quantity of sludge might be actually measured in terms of the volume of sludge, but might be expressed in terms of the mass of the sludge. The mass can be derived from the volume, once the density of the sludge is known. In other words, there is a known equivalence between mass and volume, whereby measuring one enables the other to be derived. Equally, measuring a flowrate of sludge as so many cubic meters per day enables the flowrate to be derived in terms of tonnes of sludge per hour. Similarly, there is a known general or approximate equivalence, as shown in Table.2, between the solids content of untreated sludge and the viscosity of that sludge. Where dimensions and units are expressed herein, that expression should be construed to include also the other units for which a known equivalence enables the other units to be derived. This manner of construing the expressions of units applies whether the expressions are guesses, or are the results of actual physical measurements.

In this specification, the expressions liquefaction, liquidising, etc, should be construed, in relation to sewage sludge, to include not only converting a solid or almost solid sludge into a liquid sludge, but to include also reducing the viscosity of a sludge that is (or might be) characterisable already as a liquid sludge.

Figure 1:
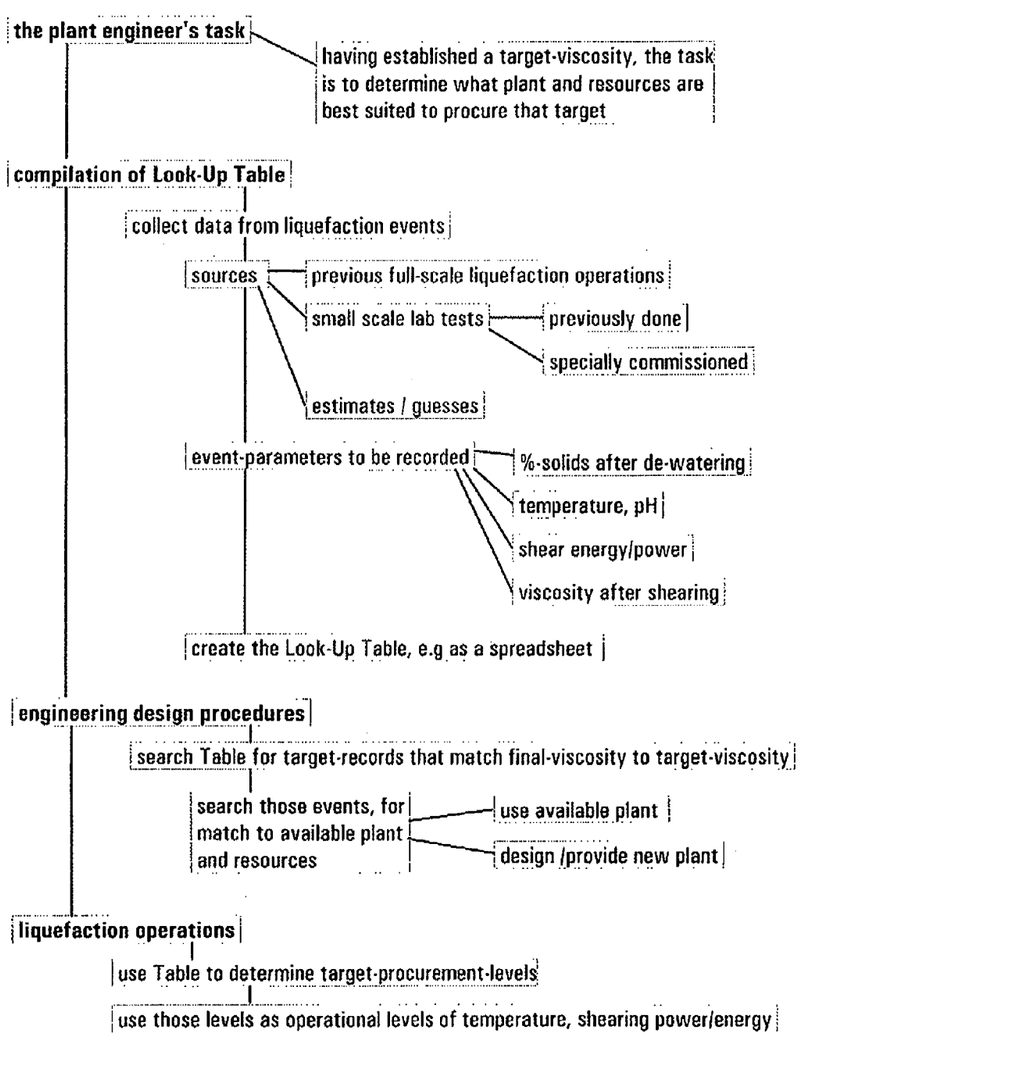
The drawing shows a flow-chart, to facilitate understanding of the invention.

The invention claimed is:

1. Procedure for liquefying dewatered sewage sludge, here termed reactor-sludge, to a target-viscosity, including:
   providing respective event-records of a number N of separate sludge-liquefaction-events, where N is three or more;
   the event-records comprise respective aggregations of records of the following event-parameters, namely:
   (i) the quantity or flowrate of dewatered event-sludge in the sludge-liquefaction event;
   (ii) the solids percentage of the event-sludge;
   (iii) the temperature of the event-sludge during liquefaction;
   (iv) the shearing power or energy applied to the event-sludge to procure liquefaction;
   (v) the final-viscosity of the liquefied event-sludge, as procured by that shearing power or energy at that temperature;
   making a compilation of the N event-records;
   identifying, in the compilation, a target-record, being one of the N event-records in which the final-viscosity matches the target-viscosity;
   determining the levels of the event-parameters in the target-record, these levels being termed the target-procurement-levels;
   passing dewatered reactor-sludge through a reactor, for liquefaction to the target-viscosity;
   the reactor contains a heater and a shearer;
   liquefying the reactor-sludge to the target viscosity, in the reactor, by:
   (a) so operating the heater that the temperature of the reactor-sludge in the reactor matches the target-procurement-level of temperature; and
   (b) so operating the shearer that the power or energy applied to the reactor-sludge in the reactor matches the target-procurement-level of power or energy; and
   after liquefaction of the dewatered reactor-sludge, discharging the liquid reactor-sludge from the reactor.

2. As in claim 1, including compiling the N event-records in such form as to enable the event-records to be presented in the form of a spreadsheet or table, in which:—
   the spreadsheet or table includes the N event-records as respective rows or lines of the table; and
   the spreadsheet or table includes the event-parameters as respective columns of the table.

3. As in claim 2, including:
   wherein the event-record includes a record of the pH of the event-sludge, during sludge-liquefaction-events, as one of the event-parameters;
   identifying the target-record also as being one of the N event-records in which the pH in the event-record matches the pH of the reactor-sludge; and
   matching the pH of the reactor-sludge to the pH of the target-record.

4. As in claim 2, including compiling one of the event-records by a full-scale-batch procedure, which includes:
   in an event-reactor containing a batch of dewatered event-sludge having a mass of one tonne or more;
   creating one of the sludge-liquefaction-events by liquefying the batch of dewatered event-sludge, by shearing and heating the event-sludge in the event-reactor;
   creating an event-record by noting the event-parameters of the sludge-liquefaction-event, including noting the amount of energy applied to the batch of event-sludge, per unit mass of the batch, by way of shearing; and
   entering that event-record as a line or row of the spreadsheet or table.

5. As in claim 2, including compiling one of the event-records by a small-batch procedure, which includes:
   providing a laboratory-batch of dewatered event-sludge, and placing the same in a test reactor;
   creating one of the sludge-liquefaction-events by liquefying the laboratory-batch of dewatered event-sludge, by shearing and heating the event-sludge in the test reactor;
   creating an event-record by noting the event-parameters of the sludge-liquefaction-event, including noting the amount of energy of shearing applied to the batch of event-sludge, per unit mass of the event-sludge; and
   entering that event-record as a line or row of the spreadsheet or table.

6. As in claim 2, including compiling one of the event-records by a full-scale-continuous procedure, which includes:
   conducting dewatered sludge through an event-reactor at a flowrate of one tonne per day or more;
   creating one of the sludge-liquefaction-events by liquefying the dewatered event-sludge by shearing and heating the event-sludge passing through the event-reactor;
   creating an event-record by noting the event-parameters of the sludge-liquefaction-event, including noting the level of power of shearing applied to the event-sludge per unit of mass-throughflow-rate of the event-sludge; and
   entering that event-record as a line or row of the spreadsheet or table.

7. As in claim 2, including compiling one of the event-records by a sample-continuous procedure, which includes:
   conducting a sample of dewatered event-sludge through a test reactor;
   creating one of the sludge-liquefaction-events by liquefying the dewatered event-sludge, by shearing and heating the event-sludge passing through the test reactor;
   creating an event-record by noting the event-parameters of the test, including noting the level of power of shearing applied to the event-sludge per unit of mass-throughflow-rate of the event-sludge; and
   entering that event-record as a line or row of the spreadsheet or table.

8. As in claim 1, including:
   making the compilation of the N event-records such that, either:—

(a) at least one of the respective final-viscosities recorded in the N event-records is higher than the target-viscosity by no more than twenty percent;

(b) or at least one of the respective final-viscosities recorded in the N event-records is lower than the target-viscosity by no more than twenty percent;

(c) or both.

9. As in claim 1, wherein the N records differ substantially from each other, as to the power or energy of shearing, as to the temperature to which the event-sludge is raised, or as to the extent to which the event-sludge is dewatered prior to being sheared and heated.

10. As in claim 1, wherein, in respect of all N event-records, the solids percentage of the event-sludge is ten percent solids or greater, and the final-viscosity is 15,000 centipoise, or lower.

11. As in claim 1, wherein all N event-records are compiled in respect of event-sludge of substantially the same composition.

12. As in claim 1, wherein the reactor-sludge is sludge that has been dewatered to a solids percentage of ten percent solids or greater.

13. As in claim 1, including identifying the target-record also as being one of the N event-records in which the solids percentage in the event-record matches the solids percentage of the reactor-sludge.

14. As in claim 1, wherein the final-viscosity matches the target-viscosity in that the final-viscosity is within twenty percent of the target-viscosity.

15. As in claim 1, wherein the temperature of the reactor-sludge in the reactor matches the target-procurement-level of temperature in that the temperature of the reactor-sludge is within ten centigrade degrees of the target-procurement-level of temperature.

16. As in claim 1, wherein the shearing power or energy applied to the reactor-sludge in the reactor matches the target-procurement-level of power or energy in that the shearing power or energy applied to the reactor-sludge is within twenty percent of the target-procurement-level.

* * * * *